United States Patent [19]

Sterzel et al.

[11] Patent Number: 4,973,606
[45] Date of Patent: Nov. 27, 1990

[54] MEMBRANES OF ORGANIC POLYMERS WHICH CONTAIN CRYSTALLINE CARRIER COMPOUNDS, AND THEIR PREPARATION

[75] Inventors: Hans-Josef Sterzel, Dannstadt-Schauernheim; Axel Sanner, Frankenthal, both of Fed. Rep. of Germany

[73] Assignee: BASF Aktiengesellschaft, Ludwigshafen, Fed. Rep. of Germany

[21] Appl. No.: 273,723

[22] Filed: Nov. 17, 1988

Related U.S. Application Data

[63] Continuation of Ser. No. 705,720, Feb. 26, 1985, abandoned.

[51] Int. Cl.$^5$ ............................ C08J 5/20; C08K 5/34
[52] U.S. Cl. ........................................ 521/27; 521/28; 524/90; 524/450; 524/204
[58] Field of Search .................... 521/27, 28; 524/450, 524/90, 204

[56] References Cited

U.S. PATENT DOCUMENTS

| | | | |
|---|---|---|---|
| 3,346,422 | 10/1967 | Berger | 521/25 |
| 4,250,081 | 2/1981 | Bode et al. | 524/450 |
| 4,464,504 | 8/1984 | Kocsis et al. | 524/450 |
| 4,515,906 | 5/1985 | Frieser | 54/27 |

FOREIGN PATENT DOCUMENTS 5767638  4/1984  Japan .

OTHER PUBLICATIONS

"Energy Technology" (Proc. Energy Technology Conference, Washington), Bd. 9 (1982), S. 505–509.
"Macromolekulare Chemie", Rapid Comm., Bd. 1 (1980), S. 753–758.

*Primary Examiner*—Peter F. Kulkosky
*Attorney, Agent, or Firm*—Keil & Weinkauf

[57] ABSTRACT

A membrane of an organic polymer, which contains a crystalline carrier compound capable of selective transport of low molecular weight substances, and the preparation and use of the said membrane.

4 Claims, No Drawings

MEMBRANES OF ORGANIC POLYMERS WHICH CONTAIN CRYSTALLINE CARRIER COMPOUNDS, AND THEIR PREPARATION

This application is a continuation of application Ser. No. 06/705,720, filed on Feb. 26, 1985 now abandoned.

Energy Technology (Proc. Energy Technology Conference, Washington), volume 9 (1982), pages 505 to 509, discloses membranes, for example of silicone rubber, polystyrene or polyethyl methacrylate, which have improved oxygen permeability. This paper also describes that the separation factor for oxygen is improved by incorporation of oxygen transfer agents. Examples of suitable membranes are stated to be liquid membranes which are applied onto a microporous polymer membrane and which contain dissolved oxygen transfer agents. A disadvantage of such membranes is their short life, of only a few months, and their insufficient permeability to oxygen. Makromolekulare Chemie, Rapid Comm., 1 (1980), 753–758 has also disclosed vinyl polymers which contain Co(salene) groups bonded to the polymer chain. The paper merely mentions that such polymers are capable of bonding oxygen.

It is an object of the present invention to provide selective membranes which have improved permeability, a good separation factor and a long life.

We have found that this object is achieved by providing membranes of organic polymers which contain crystalline carrier compounds, capable of selective transport of low molecular weight substances.

The invention also relates to a process for the preparation of membranes, wherein a solution containing the polymer and the carrier compound capable of selective transport of low molecular weight substances is applied onto a microporous supporting membrane and the solvent is evaporated to form a membrane of the polymer, which contains, in crystalline form, the carrier substance capable of selective transport of low molecular weight compounds.

Finally, the invention relates to the use of such membranes for separating off molecular oxygen, and for separating hydrocarbons into linear and branched isomers.

The novel membranes are distinguished by good permeability and a high separation factor. Moreover, they have a longer life, making them suitable for industrial use.

The novel membranes are made up of polymers. Examples of suitable polymers are hydrogenated styrene-butadiene block copolymers, copolymers of styrene and maleic acid or ethylene and acrylic acid, polyether-sulfones and polysulfones. Polyether-sulfones, polysulfones and hydrogenated styrene-butadiene block copolymers have proved particularly suitable.

The polymer membranes contain crystalline carrier compounds capable of selective transport of low molecular weight substances. Such carrier compounds are capable of taking up low molecular weight substances, such as molecular oxygen, and releasing them again, reversibly. Examples of suitable compounds are the Co(salene) compounds of the formula

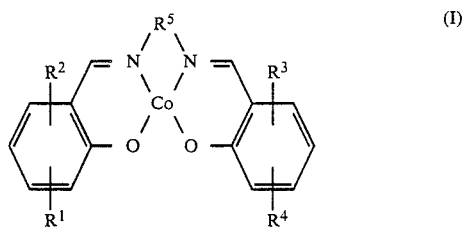

where $R^1$, $R^2$, $R^3$ and $R^4$ are each hydrogen, methyl, methoxy, fluorine or trifluoromethyl and $R^5$ is —CH$_2$CH$_2$— or is

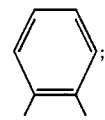

particularly preferred Co(salene) compounds are those where $R^1$, $R^2$, $R^3$ and $R^4$ are each hydrogen and $R^5$ is —CH$_2$CH$_2$—.

Other suitable carrier compounds are zeolites used as molecular sieves, especially Y-zeolite.

The membranes arc as a rule from 5 to 100 um thick and advantageously contain from 2 to 70% by volume, especially from 5 to 20% by volume, of the crystalline carrier compounds capable of selective transport of low molecular weight substances. Advantageously, the crystal size of the carrier compounds is such that transportable webs extending through the membrane are formed, i.e. the crystals have a length of from 5 to 100 μm. The novel membranes are advantageously applied onto microporous membranes known for use as microfiltration membranes, for example membranes made of polyethylene, polypropylene or polytetrafluoroethylene. These supporting membranes can be a sheet-like structure, such as a plate module or spiral module, or can be in the form of hollow fibers and hollow fiber modules.

Advantageously, the membranes according to the invention are prepared by dissolving the corresponding polymer and the carrier compound in a conjoint solvent. The resulting solution is then applied onto a microporous supporting membrane, for example of polyethylene, polypropylene or polytetrafluoroethylene, and the solvent is evaporated. Advantageously, this evaporation is carried out slowly and uniformly, resulting in a polymer membrane in which the carrier substance is present in crystalline form.

The preparation of zeolites of the aluminosilicate type or zirconium-phosphate type can also be carried out analogously to the hydrothermal synthesis, in the presence of organic solvents. To do so, the water is partially or entirely replaced by polar organic solvents, which are also solvents for the polymers to be used. Examples of such solvents are alcohols, ethers and amines. Along the first-mentioned, it is generally possible to employ monohydric, dihydric or polyhydric, primary, secondary or tertiary alcohols, e.g. CH$_3$OH, CH$_3$CH$_2$OH, (CH$_3$)$_2$CH—OH, butanediol and hexanediol.

As ethereal solvents, linear or cyclic ethers containing a (—CH$_2$—CH$_2$—O) group may be employed, such as mono-, di-, tri- and tetra-ethylene glycol dimethyl ethers (glymes), diethyl ether, tetrahydrofuran, dioxane or mixtures of these.

Amines which may be employed are primary or secondary amines such as dipropylenetriamine, dihexamethylenetriamine, hexamethylenediamine, propylenediamine, diethylenetriamine, triethylenetriamine or mixtures of these amines.

However, other polar solvents, such as ketones, especially acetone and methyl ethyl ketone, acid amides, eg. dimethylformamide, dimethylacetamide, formamide, acetamide or N-methylpyrrolidone, and sulfur-containing solvents, such as dimethylsulfoxide, sulfolane or diphenylsulfone are also suitable.

Employing the usual conditions for the synthesis of zeolites, the latter are crystallized at from 110° to 170° C., for a period of from several hours to several days, under the autogenous pressure of the solvent. Before final conclusion of the crystallization, the solution is advantageously applied to a carrier, as mentioned above, and the solvent is evaporated. The crystallization is completed during the evaporation of the solvent. Analogously to the sol-gel technique for the production of glasses and ceramics, it is also possible to produce zeolites directly from starting materials in solution, for example from alkoxides of the $Si(OR)_4Al(OR)_3$ or $Zr(OR)_4\text{-}Ti(OR)_4$ or NaOR type, where R is, in each case, alkane $C_nH_{2n+1}$, with n being from 1 to 10. The starting materials are mixed, in the desired molar ratios, in the solution of a polymer which is stable to alkalis, and the appropriate zeolite is produced by permitting access of water.

Membranes which contain carrier compounds of the formula I are suitable for removing molecular oxygen from gases containing the latter, while membranes which contain zeolites as carriers are suitable for the separation of linear isomers from branched isomers of hydrocarbons. Such membranes are particularly suitable for separating hydrocarbons of 3 to 6 carbon atoms.

The membranes containing zeolites can also be used as ion exchange membranes. Ion exchange membranes consisting of organic polymers, especially hydrogenated styrene/butadiene block copolymers, with inorganic fillers, capable of conducting ions, suspended therein, are already being developed for use as separators in alkaline high-performance batteries. The proportion by volume of filler is 40–45%, in order to have touching particles provide the requisite conductivity. In the case of the membranes according to the invention, conductivity channels are formed at substantially lower proportions by volume of filler, because of the directional orientation of the crystallization.

The Example which follows illustrates the invention.

EXAMPLE 0.6 g of the cobalt chelate complex of salicylaldehydeethylenediamine-cobalt$^{2+}$, also known as Co(salene), and 1.0 g of polysulfone (Udel 1700 P from U.C.C.) were conjointly dissolved in 50 ml of pyridine, with the exclusion of oxygen. A microporous polytetrafluoroethylene membrane was impregnated with this solution. After the excess solution had drained off, the membrane was slowly dried under nitrogen, whereupon Co(salene) crystallized out.

To activate the carrier, the membrane was kept for 2 hours at 100° C. under 0.1 mbar pressure. Upon admitting air into the drying vessel, the membrane color changed from brown to black. The weight increase relative to the untreated supporting membrane showed that 100 cm$^2$ of carrier surface were coated with about 160 mg of the membrane according to the invention. The mean coating thickness was accordingly about 13 um.

To measure the permeability and selectivity, the membrane was clamped pressure-tight in a test chamber. A coarse-pored sintered glass disk served as the support. On the access side, dry oil-free air at 30° C. was led past the membrane. On the opposite side, the pressure was reduced by means of a vacuum pump. Oxygen began to pass through below 80 mbar. At an oxygen partial pressure of about 40 mbar, the permeability, based on free membrane surface, was about $3.10^{-6}$ cm$^3$.cm/cm$^2$ s.cm Hg. The oxygen/nitrogen separation factor was greater than 1,000.

We claim:

1. A membrane having a thickness of from 5 to 100 μm of an organic polymer, wherein the organic polymer used is a polyether-sulfone, polysulfone, hydrogenated styrene/butadiene block copolymer or styrene/maleic anhydride copolymer containing a crystalline carrier compound wherein the crystals have a length of from 5 to 100 μm capable of selective transport of low molecular weight substances, said carrier being a compound of the formula I

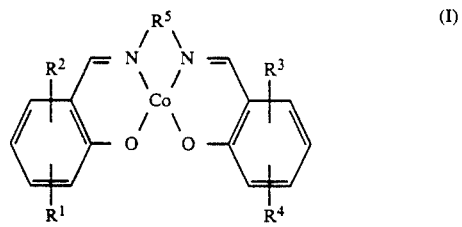

where R$^1$, R$^2$, R$^3$ and R$^4$ are each hydrogen, methyl, methoxy, fluorine or trifluoromethyl and R$_5$ is -CH$_2$CH$_2$- or

or a zeolite, said supported membrane being produced by evaporating a solution of crystalline carrier compound and said polymer which has been applied onto said microporous membrane, and wherein the zeolite is produced from zeolite starting material in said applied polymer solution.

2. A membrane as claimed in claim 1, which contains from 2 to 70% by volume of carrier compounds.

3. A process for the preparation of a microporous carrier supported membrane of an organic polymer, wherein the organic polymer used is a polyether-sulfone, polysulfone, hydrogenated styrene/butadiene block copolymer or ethylene/acrylic acid or styrene/maleic anhydride copolymer which contains a crystalline carrier compound capable of selective transport of low molecular weight substances, said carrier being a compound of the formula I

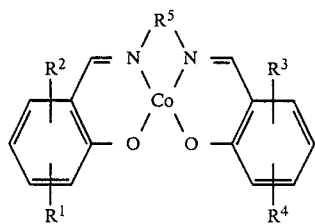 (I)

where $R^1$, $R^2$, $R^3$ and $R^4$ are each hydrogen, methyl, methoxy, fluorine or trifluoromethyl and $R_5$ is —$CH_2C$-$H_2$— or

, or a zeolite, wherein a solution containing the polymer and the carrier compound capable of selective transport of low molecular weight substances is applied onto a microporous carrier membrane and the solvent is evaporated to form a microporous carrier supported membrane of the polymer, which contains, in crystalline form, the carrier substance capable of selective transport of low molecular weight compounds.

4. A process as claimed in claim 3, wherein a microporous carrier supported zeolite is produced from zeolite starting materials in the solution of the polymer.

* * * * *

UNITED STATES PATENT AND TRADEMARK OFFICE
CERTIFICATE OF CORRECTION

PATENT NO. : 4,973,606

DATED : November 27, 1990

INVENTOR(S) : Hans-Josef STERZEL et al.

It is certified that error appears in the above-identified patent and that said Letters Patent is hereby corrected as shown below:

ON THE TITLE PAGE:

Please insert [30] --Foreign Application Priority Data
February 28, 1984...Fed. Rep. of Germany   DE ..3407149--

Signed and Sealed this

Seventeenth Day of March, 1992

*Attest:*

HARRY F. MANBECK, JR.

*Attesting Officer*          *Commissioner of Patents and Trademarks*